(12) United States Patent
Verma

(10) Patent No.: US 9,667,652 B2
(45) Date of Patent: May 30, 2017

(54) MOBILE REMOTE ACCESS

(75) Inventor: Mohan Verma, Sunnyvale, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 643 days.

(21) Appl. No.: 12/547,032

(22) Filed: Aug. 25, 2009

(65) Prior Publication Data

US 2011/0051698 A1 Mar. 3, 2011

(51) Int. Cl.
*H04L 29/06* (2006.01)
*H04W 12/04* (2009.01)
*H04W 12/06* (2009.01)

(52) U.S. Cl.
CPC .......... *H04L 63/164* (2013.01); *H04W 12/04* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 8,131,209 B1* | 3/2012 | Chen et al. | | 455/11.1 |
| 9,036,510 B1* | 5/2015 | Zhou et al. | | 370/260 |
| 2002/0037741 A1* | 3/2002 | Tjalldin et al. | | 455/552 |
| 2004/0258028 A1* | 12/2004 | Hossain et al. | | 370/335 |
| 2004/0267874 A1* | 12/2004 | Westberg et al. | | 709/200 |
| 2007/0104169 A1* | 5/2007 | Polson | | 370/338 |
| 2007/0104197 A1* | 5/2007 | King | | 370/392 |
| 2008/0167003 A1* | 7/2008 | Wang et al. | | 455/411 |
| 2009/0022152 A1* | 1/2009 | Henry et al. | | 370/389 |
| 2009/0046591 A1* | 2/2009 | Krishnaswamy | | H04L 63/029 370/252 |
| 2009/0119719 A1* | 5/2009 | Matsuzaki et al. | | 725/74 |
| 2009/0328189 A1* | 12/2009 | Budyta et al. | | 726/14 |
| 2010/0124196 A1* | 5/2010 | Bonar et al. | | 370/329 |
| 2010/0267368 A1* | 10/2010 | Masputra | | 455/414.1 |
| 2010/0290444 A1* | 11/2010 | Souissi et al. | | 370/338 |

* cited by examiner

*Primary Examiner* — Christine Duong
(74) *Attorney, Agent, or Firm* — Brooks, Cameron & Huebsch, PLLC

(57) ABSTRACT

Providing mobile remote access in a secure manner. A bridge application is provided for devices such as smart phones which establishes a first secure connection to a host controller using a carrier network, advertises one or more SSIDs using a second wireless connection on the device such as an IEEE 802.11 interface, accepting and authenticating connections from a target device to the advertised SSID, and acting as a bridge for traffic between the target device and the host controller. The bridge application may be delivered to the device fully configured, or it may be delivered unconfigured with configuration information either supplied by the user or provided in an e-mail to the user of the device.

18 Claims, 1 Drawing Sheet

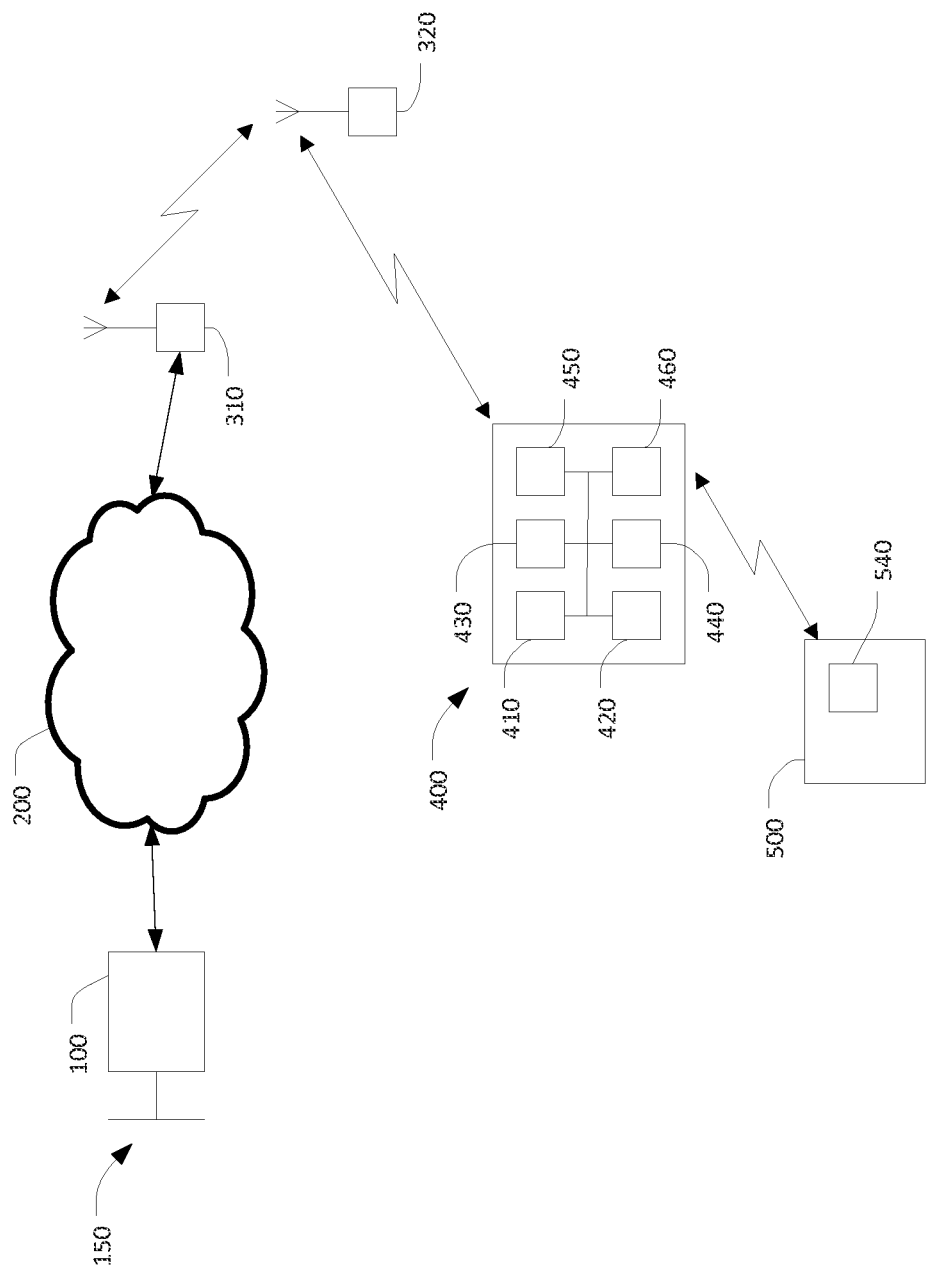

MOBILE REMOTE ACCESS

BACKGROUND OF THE INVENTION

The present invention relates to wireless digital networks, and in particular, to the problem of providing secure mobile remote access to wireless digital networks.

Wireless digital networks, particularly IEEE 802.11 WiFi networks operated in the enterprise, provide secure controlled access to resources. An enterprise typically devotes significant resources to establishing and maintaining network security, for example by using firewalls to limit ingress, egress, and traffic types, authentication and access controls to limit use of network resources to only those so authorized, and filtering to protect users and system resources from viruses, worms, and other hostile actions.

When members of the enterprise take their digital devices, such as laptop computers, outside the corporate network environment, they still wish to access these same resources, but they are now operating outside the protective layers of the enterprise infrastructure.

What is needed is a way of providing secure remote access to networks to users in a mobile environment.

BRIEF DESCRIPTION OF THE DRAWINGS

The invention may be best understood by referring to the following description and accompanying drawing that is used to illustrate embodiments of the invention in which:

The FIGURE shows devices in a wireless network.

DETAILED DESCRIPTION

Embodiments of the invention relate to methods of securely extending networks. Bridge software is provided for operating in a client device such as a smart phone which uses the device's wireless capability such as GSM, CDMA, 3G, 4G, or other carrier-supplied cellular wireless wide area network (WWAN), to establish a secure tunnel to a corporate controller. The bridge then uses the device's short range wireless capability, such as 802.11 WiFi wireless, to advertise one or more SSIDs from the corporate environment. The bridge authenticates a user and establishes a communications path between the user and the corporate controller.

The FIGURE shows a network in which controller 100 connects to enterprise network 150, and to a wide area network 200 such as the Internet. Carrier connections 310 and 320 support connections from client devices 400 through a combination of carrier WWAN networks connecting to the Internet 200.

Client device 400 is a purpose-built digital device such as a smart phone. Client device 400 contains, for example, CPU 410, memory hierarchy 420, display 430, input device 440 such as a touchpad and/or switches, a first wireless interface 450 for communicating with a carrier wireless system which may include 3G and/or 4G networks, and a second wireless interface 460 such as an IEEE 802.11 wireless interface. CPU 410 is a suitable CPU which may be from Acorn, Intel, MIPS, or other suitable device. Memory hierarchy 420 includes fast read/write memory such as RAM, and layers of persistent storage such as Flash and/or EEPROM for storing operating system code and data, user files such as calendars, music, photos and the like, and downloadable applications.

Target device 500 is a wireless digital device as known to the art such as a laptop computer, with wireless interface 540 such as an IEEE 802.11 wireless interface.

According to the present invention, a bridge is provided in the form of a software application for use on client device 400. In operation, the bridge establishes a connection through first wireless interface 450 using the client network back to controller 100. Once a connection is established, a secure tunnel known to the art such as an IPSEC or GRE tunnel is established between controller 100 and client device 400. Using information provided by controller 100, the bridge advertises one or more SSIDs using second wireless interface 460, typically an IEEE 802.11 WiFi interface.

Target device 500 then connects to client device 400 through one of the advertised SSIDs. This connection may be authenticated by the bridge running in client device 400, authentication may be processed by sending information back to controller 100, or a combination approach may be used, with initial authentication performed by client device 400 with a more complex or more complete authentication being performed at controller 100. While any IEEE 802.11 connection may be used between target device 500 and client device 400, a secure connection such as a WPA or WPA2 connection is preferred.

In one embodiment, secure communications between target device 500 and client device 400 are supported by having the encryption/decryption process performed in controller 100. In such an embodiment, controller 100 performs as an example WPA2 encryption on packets for target device 500, and encapsulates them for transport to client device 400. The bridge on client device 400 removes the encapsulation and transmits the WPA2 encrypted packets to target device 500.

Once the secure connection is formed between target device 500 and client device 400, the bridge mediates the transfer of data between target device 500 and controller 100. Target device 500 is now operating through a secure extension of controller 100.

According to the present invention, the bridge may be downloaded to target device 400 preconfigured for use with controller 100, containing for example the public-facing IP address of controller 100 via WAN 200, or the bridge may be supplied unconfigured, with the user of client device 400 responsible for supplying information for making an initial contact with controller 100 for authentication and configuration. This information may be in the form of an IP address, or a coded token which contains an IP address.

Authentication of client device 400 with controller 100 may be accomplished for example using certificates present on or provided to client device 400, through recognizing identification information about client device 400 such as serial numbers, MAC addresses, and the like which have been previously registered with controller 100, or through other suitable means such as passwords, challenge and response, or the like. In one embodiment of the invention, the bridge is provided in an unconfigured form, with configuration information sent separately, such as in a separate e-mail, or as an attachment to an e-mail message which is recognized by the bridge application.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded from a computer readable medium and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. An apparatus, comprising:
a processor; and
a non-transitory computer-readable medium storing instructions to cause the processor to:
establish a secure tunnel with a network device, wherein the secure tunnel includes a connection over a cellular network;
provide a wireless signal using a Service Set Identifier (SSID);
establish a secure connection with a target device using the SSID;
authenticate the secure connection with the target device;
transmit authentication information of the target device to the network device;
establish an authenticated connection with the target device;
receive encapsulated data associated with the network device, wherein the encapsulated data is received over the secure tunnel;
de-encapsulate the data; and
transmit the de-encapsulated data over the secure connection to the target device;
transmit second data received from the network device to the target device via the authenticated connection;
receive a security key over the secure connection, wherein the security key is transmitted via the secure tunnel;
receive authentication information associated with the security key; and
verify the security key to authenticate the target device associated with the secure connection.

2. The apparatus of claim 1, wherein the non-transitory computer-readable medium is further to cause the processor to receive authentication information over the secure tunnel, wherein the authentication information includes information to authorize the secure tunnel.

3. The apparatus of claim 1, wherein the non-transitory computer-readable medium is further to cause the processor to receive configuration information over the secure tunnel.

4. The apparatus of claim 1, wherein the non-transitory computer-readable medium is further to cause the to receive initialization information for establishing the secure tunnel.

5. The apparatus of claim 4, wherein the initialization information includes an identity of the network device.

6. The apparatus of claim 4, wherein the initialization information is received over the secure connection.

7. A non-transitory machine-readable medium including instructions that, when executed by processor, causes the processor to:
establish a secure tunnel with a network device, wherein the secure tunnel includes a connection over a cellular network;
provide a wireless signal using a Service Set Identifier (SSID);
establish a secure connection with a target device using the SSID;
authenticate the secure connection with the target device;
transmit authentication information of the target device to the network device;
establish an authenticated connection with the target device;
receive encapsulated data associated with the network device, wherein the encapsulated data is received over the secure tunnel;
de-encapsulate the data;
transmit the de-encapsulated data over the secure connection to the target device; transmit second data received from the network device to the target device via the authenticated connection;
receive a security key over the secure connection, wherein the security key is transmitted via the secure tunnel;
receive authentication information associated with the security key; and
verify the security key to authenticate the target device associated with the secure connection.

8. The non-transitory machine readable medium of claim 7, further comprising instructions to cause the processor to receive authentication information over the secure tunnel, wherein the authentication information include information to authorize the secure tunnel.

9. The non-transitory machine readable medium of claim 7, further comprising instructions to cause the processor to receive configuration information over the secure tunnel.

10. The non-transitory machine readable medium of claim 7, further comprising instructions to cause the processor to receive initialization information for establishing the secure tunnel.

11. The non-transitory machine readable medium of claim 10, wherein the initialization information includes an identity of the network device.

12. The non-transitory machine readable medium of claim 10, wherein the initialization information is received over the secure connection.

13. A method, comprising:
establishing a secure tunnel with a network device, wherein the secure tunnel includes a connection over a cellular network;
providing a wireless signal using a Service Set Identifier (SSID);
establishing a secure connection with a target device using the SSID;
authenticating the secure connection with the target device;
transmitting authentication information of the target device to the network device;
establishing an authenticate connection with the target device;
receiving encapsulated data associated with the network device, wherein the encapsulated data is received over the secure tunnel;
de-encapsulating the data;
transmitting the de-encapsulated data over the secure connection to the target device;

transmitting second data received from the network device to the target device via the authenticated connection;

receiving a security key over the secure connection, wherein the security key is transmitted via the secure tunnel;

receiving authentication information associated with the security key; and verifying the security key to authenticate the target device associated with the secure connection.

14. The method of claim 13, further comprising receiving authentication information over the secure tunnel, wherein the authentication information includes information to authorize the secure tunnel.

15. The method of claim 13, further comprising receiving configuration information over the secure tunnel.

16. The method of claim 13, further comprising receiving initialization information for establishing the secure tunnel.

17. The method of claim 16, wherein the initialization information includes an identity of the network device.

18. The method of claim 16, wherein the initialization information is received over the secure connection.

\* \* \* \* \*